United States Patent
Zhang et al.

(10) Patent No.: US 11,192,064 B2
(45) Date of Patent: Dec. 7, 2021

(54) ELECTROCHEMICAL HYDROGEN PUMP AND METHOD FOR OPERATING ELECTROCHEMICAL HYDROGEN PUMP

(71) Applicant: Panasonic Intellectual Property Management Co., Ltd., Osaka (JP)

(72) Inventors: Jin Zhang, Osaka (JP); Hidenobu Wakita, Kyoto (JP); Atsuo Okaichi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 16/357,991

(22) Filed: Mar. 19, 2019

(65) Prior Publication Data

US 2019/0316603 A1 Oct. 17, 2019

(30) Foreign Application Priority Data

Apr. 16, 2018 (JP) .............................. JP2018-078752

(51) Int. Cl.
*B01D 53/32* (2006.01)
*F04F 9/02* (2006.01)
*C25B 15/02* (2021.01)
*C25B 15/021* (2021.01)

(52) U.S. Cl.
CPC ............ *B01D 53/326* (2013.01); *C25B 15/02* (2013.01); *C25B 15/021* (2021.01); *F04F 9/02* (2013.01)

(58) Field of Classification Search
CPC .............................. C25B 15/02; B01D 53/326
See application file for complete search history.

(56) References Cited

U.S. PATENT DOCUMENTS

| 10,722,841 | B2 * | 7/2020 | Ukai .......................... C25B 9/73 |
| 2016/0002795 | A1 | 1/2016 | Beverage et al. |
| 2016/0341449 | A1 | 11/2016 | Bahar et al. |

FOREIGN PATENT DOCUMENTS

| JP | 2006-070322 | 3/2006 |
| JP | 2010-189707 | 9/2010 |
| JP | 2015-117139 | 6/2015 |
| KR | 1713494 B1 | 3/2017 |
| WO | 2012/091692 | 7/2012 |

OTHER PUBLICATIONS

The Extended European Search Report dated Jul. 30, 2019 for the related European Patent Application No. 19162711.6.

* cited by examiner

*Primary Examiner* — Nicholas A Smith
(74) *Attorney, Agent, or Firm* — McDermott Will and Emery LLP

(57) ABSTRACT

An electrochemical hydrogen pump includes: a cell including a proton conductive electrolyte membrane having a first main surface and a second main surface, a cathode disposed on the first main surface of the proton conductive electrolyte membrane, and an anode disposed on the second main surface of the proton conductive electrolyte membrane; a voltage applier that applies a voltage between the anode and the cathode; a cooler that cools the cell; and a controller that controls the cooler to increase an amount of cooling per unit time of the cell when a pressure of a cathode gas flow path on the cathode increases.

10 Claims, 6 Drawing Sheets

200

US 11,192,064 B2

ELECTROCHEMICAL HYDROGEN PUMP AND METHOD FOR OPERATING ELECTROCHEMICAL HYDROGEN PUMP

BACKGROUND

1. Technical Field

The present disclosure relates to an electrochemical hydrogen pump and a method for operating the electrochemical hydrogen pump.

2. Description of the Related Art

In recent years, hydrogen has received attention as a clean alternative energy source in place of fossil fuel from the viewpoint of environmental problems such as global warming and energy problems such as depletion of petroleum resources. Hydrogen is promising for clean energy because, in principle, only water is released as a result of combustion of hydrogen, and carbon dioxide that is a cause of global warming is not released and nitrogen oxides are substantially not released. For example, fuel cells are used as devices that use hydrogen as a fuel with high efficiency. Such fuel cells have been developed and put into widespread use for power supplies for automobiles and independent power generation for household use.

In the forthcoming hydrogen society, the technical development will be demanded for production of hydrogen, high-density storage of hydrogen, and transport or use of hydrogen in a small amount at low cost. In particular, a hydrogen supply infrastructure needs to be built to facilitate the widespread use of fuel cells serving as distributed energy sources.

To stably supply hydrogen in a hydrogen supply infrastructure, various proposals for purification and pressurization of high-purity hydrogen have been made.

For example, Japanese Unexamined Patent Application Publication No. 2015-117139 discloses a hydrogen purifying/pressurizing system which includes an electrolyte membrane between an anode and a cathode and in which hydrogen is purified and pressurized by applying a voltage between the anode and the cathode. Herein, a multilayer structural body constituted by an anode, an electrolyte membrane, and a cathode is referred to as a membrane electrode assembly (hereafter may be abbreviated as MEA).

In such a hydrogen purifying/pressurizing system, the electrolyte membrane and an anode power feeder deform because of high gas pressure on the cathode side, which may increase the contact resistance between a cathode power feeder, and the electrolyte membrane and the anode power feeder.

Accordingly, Japanese Unexamined Patent Application Publication No. 2006-70322 proposes a pressing structure including a conical spring or a coil spring for bringing the cathode power feeder into contact with the electrolyte membrane even if the electrolyte membrane and the anode power feeder are deformed.

SUMMARY

Since hydrogen energy has been desirably used with high efficiency, it is important to improve the efficiency of a hydrogen compression operation of the electrochemical hydrogen pump.

In the related art, the improvement in the efficiency of a hydrogen compression operation has been studied from the viewpoint of electrical contact between a catalyst layer and a power feeder of the electrochemical hydrogen pump. However, the improvement in the efficiency of a hydrogen compression operation from the viewpoint of the diffusivity of hydrogen in an electrochemical hydrogen pump has not been studied.

One non-limiting and exemplary embodiment provides an electrochemical hydrogen pump in which the efficiency of a hydrogen compression operation can be improved compared with that in the related art and a method for operating the electrochemical hydrogen pump.

In one general aspect, the techniques disclosed here feature an electrochemical hydrogen pump including a cell including a proton conductive electrolyte membrane having a first main surface and a second main surface, a cathode disposed on the first main surface of the proton conductive electrolyte membrane, and an anode disposed on the second main surface of the proton conductive electrolyte membrane; a voltage applier that applies a voltage between the anode and the cathode; a cooler that cools the cell; and a controller that controls the cooler to increase an amount of cooling per unit time of the cell when a pressure of a cathode gas flow path on the cathode increases.

In the electrochemical hydrogen pump and the method for operating an electrochemical hydrogen pump according to one aspect of the present disclosure, the efficiency of a hydrogen compression operation can be improved compared with that in the related art.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An improvement in the efficiency of a hydrogen compression operation of an electrochemical hydrogen pump has been thoroughly studied. It has been gradually found that the performance of pumps is dependent on the distribution state of water in an MEA (cell) of an electrochemical hydrogen pump.

For example, an electrolyte membrane of an MEA needs to be maintained in a desired wet state to achieve high proton conductivity of the electrolyte membrane. That is, the wet state of an electrolyte membrane is directly linked to the electrical resistance of the electrolyte membrane and is thus an important factor that determines the cell resistance of an electrochemical hydrogen pump. An increase in the cell resistance decreases the operation efficiency of the electrochemical hydrogen pump. Therefore, for example, hydrogen ($H_2$) to be supplied to an anode of an MEA is often humidified with a humidifier in advance.

When an electric current flows between an anode and a cathode of an MEA, protons move from the anode to the cathode through an electrolyte membrane together with water molecules (electroosmosis). Herein, as the temperature of the MEA increases, the proton conductivity of the electrolyte membrane increases, which increases the efficiency of a hydrogen compression operation of the electrochemical hydrogen pump.

On the other hand, the water that has been subjected to electroosmosis so as to move from the anode to the cathode of the MEA moves from the cathode to the anode because of the differential pressure between the cathode and the anode of the MEA (back diffusion). At this time, the amount of water that back-diffuses through the electrolyte membrane is dependent on the differential pressure between the cathode and the anode of the MEA and the MEA temperature. Specifically, the amount of water that moves from the cathode to the anode of the MEA increases as the gas pressure on the cathode side (hereafter referred to as a cathode-side pressure) increases and the MEA temperature increases.

In view of the foregoing, the present inventors have found that the efficiency of a hydrogen compression operation of an electrochemical hydrogen pump can be improved by appropriately controlling the MEA temperature of the electrochemical hydrogen pump. This finding has been verified by the following experiment.

Figure 1:
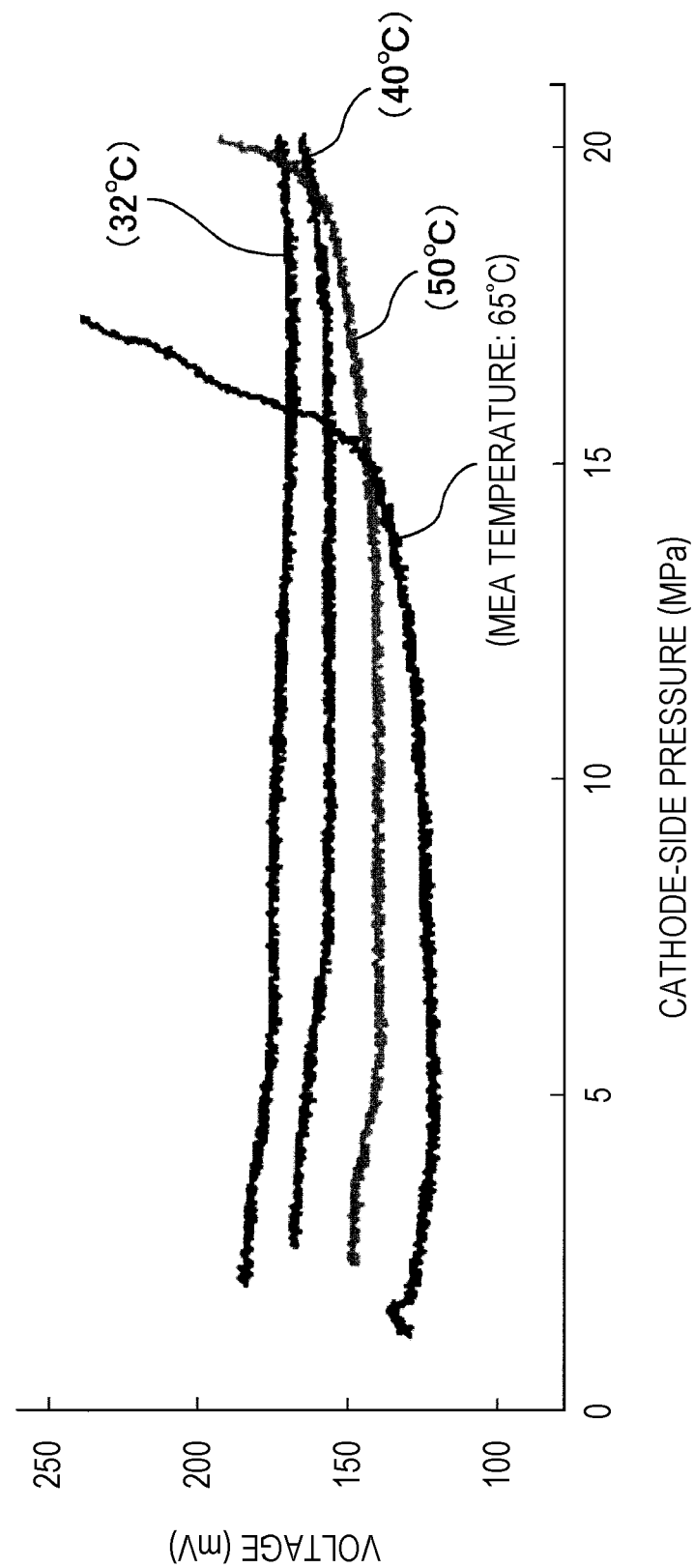
FIG. 1 illustrates an example of plotted measurement results of a correlation between a cathode-side pressure and a voltage in an electrochemical hydrogen pump using an MEA temperature as a parameter.

FIG. 1 illustrates an example of plotted measurement results of a correlation between a cathode-side pressure and a voltage in an electrochemical hydrogen pump using an MEA temperature as a parameter.

An MEA (single cell) used in this experiment includes an anode gas diffusion layer formed of a titanium (Ti) powder sintered body that has a diameter of about 67 mm and is plated with platinum and a cathode gas diffusion layer formed of a Ti fiber sintered body that has a diameter of about 67 mm and is plated with platinum. Such an MEA structure is merely illustrative and is not limited to that in this example.

The experimental conditions are as follows.

This experiment was performed using four representative MEA temperatures (32° C., 40° C., 50° C., and 65° C.) as parameters at a constant anode-side gas pressure of 0.2 MPa so that a constant current of 1 $A/cm^2$ in terms of current density flowed between an anode and a cathode of an electrochemical hydrogen pump. Hydrogen ($H_2$) supplied to the anode of the MEA was in a fully humidified state such that the dew point of the hydrogen was substantially equal to each of the MEA temperatures serving as parameters in this experiment. For each of the MEA temperatures, the anode of the MEA was in a dry state when an increase in the cathode-side gas pressure of the MEA was started, and the cathode-side pressure was increased to about 20 MPa in the end.

The above experimental conditions are merely illustrative and are not limited to those in this example.

When the electric current is caused to flow between the anode and the cathode after the hydrogen is supplied to the anode of the MEA of the electrochemical hydrogen pump, the cathode-side pressure is gradually increased from the normal pressure over time by sealing the cathode side of the MEA.

Figure 2:
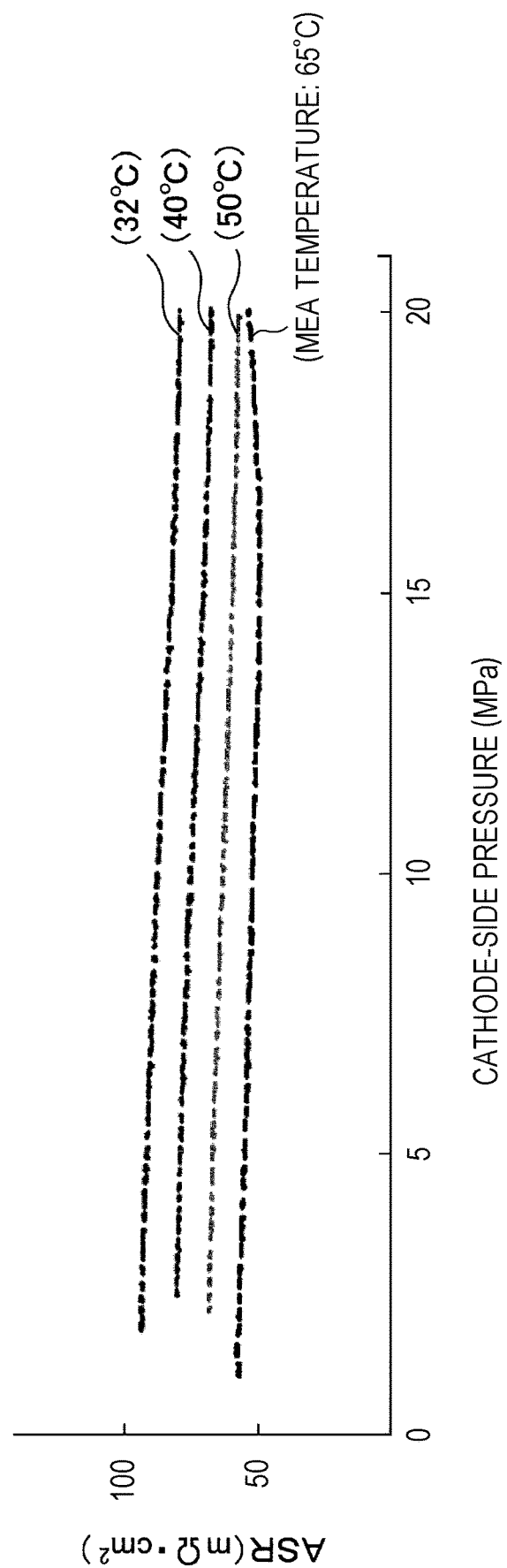
FIG. 2 illustrates an example of plotted measurement results of a correlation between a cathode-side pressure and an ASR of an MEA in an electrochemical hydrogen pump using an MEA temperature as a parameter.

As illustrated in FIG. 1, when the cathode-side pressure is about 14 MPa or less, the voltage of the electrochemical hydrogen pump becomes lower as the MEA temperature increases. This is because the proton conductivity of the electrolyte membrane is higher at a high MEA temperature than at a low MEA temperature. This is supported by the following. As illustrated in FIG. 2, the area specific resistance (ASR) of the MEA of the electrochemical hydrogen pump decreases as the MEA temperature increases in the cathode-side pressure range from normal pressure to 20 MPa.

In other words, in the cathode-side pressure range of about 14 MPa or less, the efficiency of a hydrogen compression operation of the electrochemical hydrogen pump can be improved by increasing the MEA temperature.

However, when the MEA temperature is set to 65° C., a rapid increase in the voltage of the electrochemical hydrogen pump has been observed in a high cathode-side pressure range of about 15 MPa or more.

Furthermore, when the MEA temperature is set to 50° C., a rapid increase in the voltage of the electrochemical hydrogen pump has been observed in a high cathode-side pressure range of about 19 MPa or more.

In contrast, when the MEA temperature is set to 40° C. or 32° C., a rapid increase in the voltage of the electrochemical hydrogen pump has not been observed in the cathode-side pressure range from normal pressure to about 20 MPa.

Such phenomena are believed to occur because the amount of water that moves from the cathode to the anode because of the differential pressure between the cathode and the anode increases as the cathode-side gas pressure increases and the MEA temperature increases, and thus the diffusivity of hydrogen on the anode side due to flooding (a blocking phenomenon due to water in a gas flow path) is inhibited.

That is, in a high cathode-side pressure range, the diffusivity of hydrogen in the MEA is appropriately ensured in the case where the MEA temperature is set to be low compared with the case where the MEA temperature is set to be high. Thus, the efficiency of a hydrogen compression operation of the electrochemical hydrogen pump can be improved.

The above cathode-side pressure and MEA temperature are merely illustrative and are not limited to those in this example.

An electrochemical hydrogen pump according to a first aspect of the present disclosure includes a cell including a proton conductive electrolyte membrane having a first surface and a second main surface, a cathode disposed on the first main surface of the proton conductive electrolyte membrane, and an anode disposed on the second main surface of the proton conductive electrolyte membrane; a voltage applier that applies a voltage between the anode and the cathode; a cooler that cools the cell; and a controller that controls the cooler to increase an amount of cooling per unit time of the cell when a pressure of a cathode gas flow path on the cathode increases.

In this configuration, the electrochemical hydrogen pump according to this aspect provides an improved efficiency of a hydrogen compression operation compared with that in the related art.

The amount of water that moves from the cathode to the anode because of the differential pressure between the cathode and the anode increases as the pressure of the cathode gas flow path increases and the cell temperature increases. That is, the amount of water that back-diffuses through the electrolyte membrane has a positive correlation with the pressure of the cathode gas flow path and the cell temperature. Therefore, the possibility that the diffusivity of an anode gas is inhibited on the anode side because of flooding increases as the pressure of the cathode gas flow path increases.

In the electrochemical hydrogen pump according to this aspect, such a possibility can be reduced by appropriately controlling the cell temperature with the cooler in the process in which the pressure of the cathode gas flow path increases. That is, when the pressure of the cathode gas flow path increases, the possibility that the diffusivity of an anode gas is inhibited on the anode side because of flooding can be reduced by increasing the amount of cooling with the cooler. This can suppress an increase in the diffusion overvoltage of the electrochemical hydrogen pump due to inhibition of the diffusivity of an anode gas on the anode side. Therefore, high efficiency of the hydrogen compression operation of the electrochemical hydrogen pump can be maintained.

In the electrochemical hydrogen pump according to the first aspect, the "increasing the amount of cooling per unit time of the cell" does not necessarily result in a decrease in the cell temperature. The "increasing the amount of cooling per unit time of the cell" may also result in the case where the cell temperature is constant or the case where an increase in the cell temperature is suppressed. An example of such a case is a case where the cell generates heat while the pressure of the cathode gas flow path increases.

In an electrochemical hydrogen pump in a second aspect according to the first aspect of the present disclosure, when the pressure of the cathode gas flow path increases, the controller may control the cooler to increase the amount of cooling per unit time of the cell so that a temperature of the cell decreases.

When the pressure of the cathode gas flow path increases, there is a possibility that the diffusivity of an anode gas is inhibited on the anode side because of flooding. In the electrochemical hydrogen pump according to this aspect, however, when the pressure of the cathode gas flow path increases, the controller increases the amount of cooling per unit time of the cell so that the temperature of the cell decreases. Thus, such a possibility can be reduced.

An electrochemical hydrogen pump in a third aspect according to the first aspect of the present disclosure may include a heater that heats the cell. When the pressure of the cathode gas flow path increases, the controller may decrease an amount of heating with the heater.

In this configuration, the electrochemical hydrogen pump according to this aspect can appropriately control the temperature of the cell with the heater in the process in which the pressure of the cathode gas flow path increases. That is, when the pressure of the cathode gas flow path increases, an increase in the temperature of the cell is suppressed by decreasing the amount of heating with the heater. Consequently, the possibility that the diffusivity of an anode gas is inhibited on the anode side because of flooding can be reduced.

In an electrochemical hydrogen pump in a fourth aspect according to the third aspect of the present disclosure, before the voltage applier applies the voltage between the anode and the cathode, the controller may start a heating operation of the heater to increase a temperature of the cell.

The differential pressure between the anode and the cathode is not generated before the voltage applier applies the voltage between the anode and the cathode. In this case, the back diffusion of water through the electrolyte membrane is less likely to occur. Thus, even if the temperature of the cell is increased to a high temperature, the inhibition of the diffusivity of an anode gas on the anode side due to flooding is suppressed. Therefore, in the electrochemical hydrogen pump according to this aspect, the temperature of the cell can be increased to a high temperature by starting a heating operation of the heater before the voltage applier applies the voltage between the anode and the cathode compared with the case where such a heating operation is not performed. Thus, the electrolyte membrane exhibits high proton conductivity at the beginning of the hydrogen compression operation of the electrochemical hydrogen pump, which can improve the efficiency of the hydrogen compression operation of the electrochemical hydrogen pump.

In an electrochemical hydrogen pump in a fifth aspect according to the third aspect of the present disclosure, the controller may control the voltage applier to apply the voltage between the anode and the cathode to increase a temperature of the cell through heating with the heater for at least a part of a duration for which the pressure of the cathode gas flow path increases, and then may decrease the amount of heating with the heater when the pressure of the cathode gas flow path increases.

In this configuration, the temperature of the cell can be appropriately controlled by the heater in the process in which the pressure of the cathode gas flow path increases. That is, at least a part of the duration for which the pressure of the cathode gas flow path increases is a duration for which the inhibition of the diffusivity of an anode gas on the anode side due to flooding is suppressed even if the temperature of the cell is increased to a high temperature. Therefore, when the temperature of the cell is increased, the electrolyte membrane exhibits high proton conductivity, which can improve the efficiency of the hydrogen compression operation of the electrochemical hydrogen pump. After that, by decreasing the amount of heating with the heater when the pressure of the cathode gas flow path increases, the possibility that the diffusivity of an anode gas is inhibited on the anode side because of flooding can be reduced.

A method for operating an electrochemical hydrogen pump including a cell in a sixth aspect of the present disclosure includes: applying a voltage between a cathode and a anode to supply high-pressure hydrogen to the cathode; and increasing an amount of cooling per unit time with a cooler that cools the cell when a pressure of a cathode gas flow path on the cathode increases. The cell includes: a proton conductive electrolyte membrane having a first main surface and a second main surface; the cathode disposed on the first main surface of the proton conductive electrolyte membrane; and the anode disposed on the second main surface of the proton conductive electrolyte membrane.

The method for operating an electrochemical hydrogen pump according to this aspect provides an improved efficiency of a hydrogen compression operation compared with that in the related art.

As described above, the amount of water that back-diffuses through the electrolyte membrane has a positive correlation with the pressure of the cathode gas flow path and the temperature of the cell. Therefore, the possibility that the diffusivity of an anode gas is inhibited on the anode side because of flooding increases as the pressure of the cathode gas flow path increases.

In the method for operating an electrochemical hydrogen pump according to this aspect, such a possibility can be reduced by appropriately controlling the temperature of the cell with the cooler in the process in which the pressure of the cathode gas flow path increases. That is, when the pressure of the cathode gas flow path increases, the possibility that the diffusivity of an anode gas is inhibited on the anode side because of flooding can be reduced by increasing the amount of cooling with the cooler. This can suppress an increase in the diffusion overvoltage of the electrochemical hydrogen pump due to inhibition of the diffusivity of an anode gas on the anode side. Therefore, high efficiency of the hydrogen compression operation of the electrochemical hydrogen pump can be maintained.

In a method for operating an electrochemical hydrogen pump in a seventh aspect according to the sixth aspect of the present disclosure, when the pressure of the cathode gas flow path increases, the amount of cooling per unit time with the cooler may be increased so that a temperature of the cell decreases.

When the pressure of the cathode gas flow path increases, there is a possibility that the diffusivity of an anode gas is inhibited on the anode side because of flooding. In the method for operating an electrochemical hydrogen pump according to this aspect, however, when the pressure of the cathode gas flow path increases, the amount of cooling per unit time with the cooler is increased so that the temperature of the cell decreases. Thus, such a possibility can be reduced.

In a method for operating an electrochemical hydrogen pump in an eighth aspect according to the seventh aspect of the present disclosure, when the pressure of the cathode gas flow path increases, an amount of heating with a heater that heats the cell may be decreased.

In the method for operating an electrochemical hydrogen pump according to this aspect, the temperature of the cell can be appropriately controlled with the heater in the process in which the pressure of the cathode gas flow path increases. That is, when the pressure of the cathode gas flow path increases, an increase in the temperature of the cell is suppressed by decreasing the amount of heating with the heater. Consequently, the possibility that the diffusivity of an anode gas is inhibited on the anode side because of flooding can be reduced.

A method for operating an electrochemical hydrogen pump in a ninth aspect according to the eighth aspect of the present disclosure may include starting a heating operation of the heater to increase the temperature of the cell before a voltage applier applies the voltage between the anode and the cathode.

The differential pressure between the anode and the cathode is not generated before the voltage applier applies the voltage between the anode and the cathode. In this case, the back diffusion of water through the electrolyte membrane is less likely to occur. Thus, even if the temperature of the cell is increased to a high temperature, the inhibition of the diffusivity of an anode gas on the anode side due to flooding is suppressed. Therefore, in the method for operating an electrochemical hydrogen pump according to this aspect, the temperature of the cell can be increased to a high temperature by starting a heating operation of the heater before the voltage applier applies the voltage between the anode and the cathode compared with the case where such a heating operation is not performed. Thus, the electrolyte membrane exhibits high proton conductivity at the beginning of the hydrogen compression operation of the electrochemical hydrogen pump, which can improve the efficiency of the hydrogen compression operation of the electrochemical hydrogen pump.

A method for operating an electrochemical hydrogen pump in a tenth aspect according to the eighth aspect of the present disclosure may include applying the voltage between the anode and the cathode using a voltage applier to increase the temperature of the cell through heating with the heater for at least a part of a duration for which the pressure of the cathode gas flow path increases, and decreasing the amount of heating with the heater when the pressure of the cathode gas flow path increases.

Thus, the temperature of the cell can be appropriately controlled by the heater in the process in which the pressure of the cathode gas flow path increases. That is, at least a part of the duration for which the pressure of the cathode gas flow path increases is a duration for which the inhibition of the diffusivity of an anode gas on the anode side due to flooding is suppressed even if the temperature of the cell is increased to a high temperature. Therefore, when the temperature of the cell is increased, the electrolyte membrane exhibits high proton conductivity, which can improve the efficiency of the hydrogen compression operation of the electrochemical hydrogen pump. After that, by decreasing the amount of heating with the heater when the pressure of the cathode gas flow path increases, the possibility that the diffusivity of an anode gas is inhibited on the anode side because of flooding can be reduced.

Hereafter, embodiments of the present disclosure will be specifically described with reference to the attached drawings. The embodiments described below are general or specific embodiments. Therefore, the numerical values, the shapes, the materials, the constituent elements, the arrangement and connection modes of constituent elements, and the like described in the embodiments below are merely illustrative and are not intended to limit the present disclosure. Among constituent elements in the following embodiments, constituent elements that are not described in independent claims expressing the broadest concept will be described as optional constituent elements. In the drawings, the description of elements having the same reference numeral may be omitted. The drawings schematically illustrate each constituent element to facilitate the understanding. Therefore, for example, the shapes and the dimensional ratios are sometimes different from actual ones.

Embodiment

Structure of Electrochemical Hydrogen Pump

Figure 3:
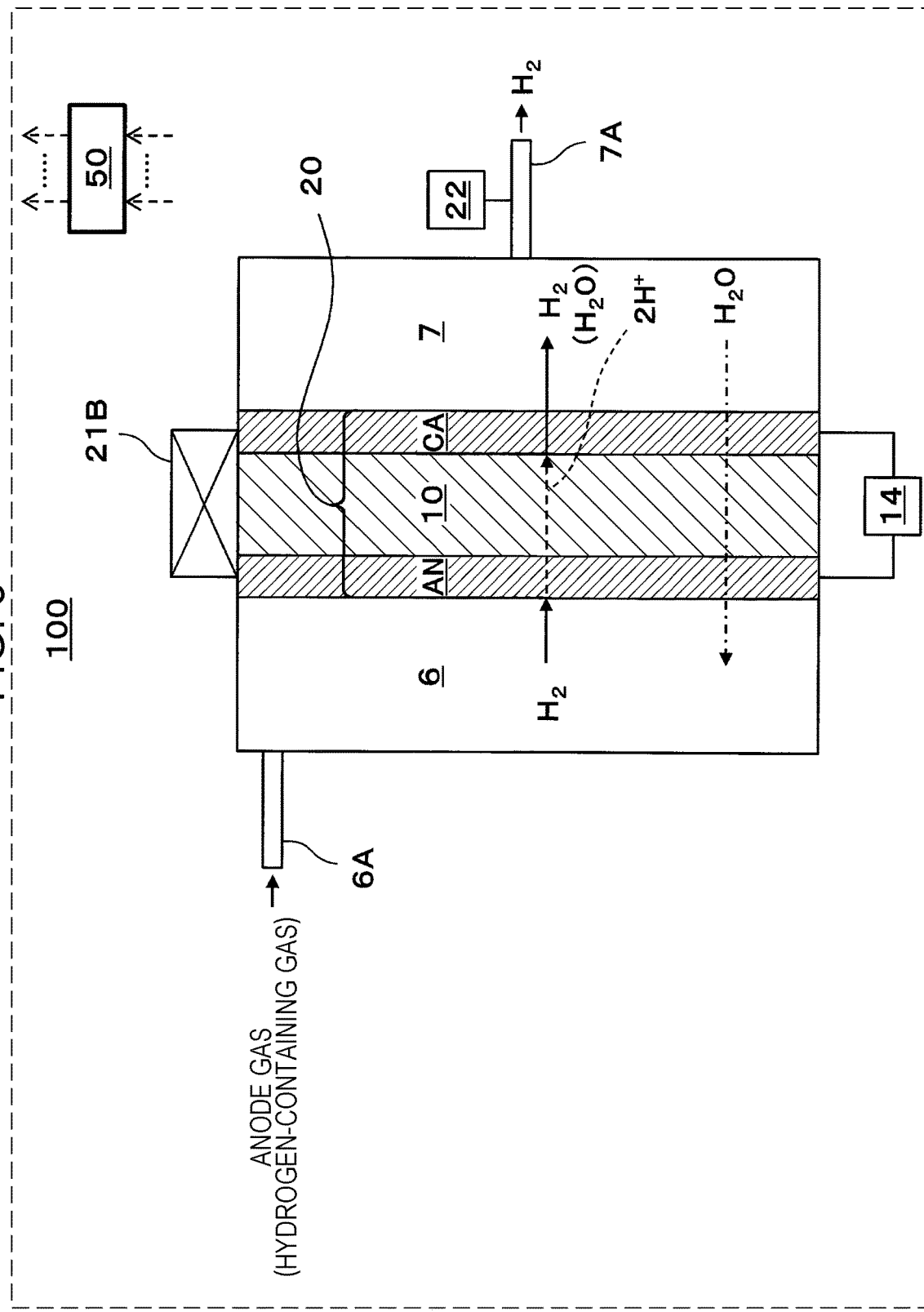
FIG. 3 illustrates an example of an electrochemical hydrogen pump according to an embodiment.

FIG. 3 illustrates an example of an electrochemical hydrogen pump according to an embodiment.

In the example illustrated in FIG. 3, an electrochemical hydrogen pump 100 includes a cell (MEA) 20, a voltage applier 14, a cooler 21B, a pressure gage 22, and a controller 50. The cell 20 includes a proton conductive electrolyte membrane 10, an anode AN, and a cathode CA.

In the electrochemical hydrogen pump 100 according to this embodiment, the cell 20 is disposed so as to partition the space in a container. The region of the container on the anode AN side constitutes an anode chamber 6 into which an anode gas flows, and the region of the container on the cathode CA side constitutes a cathode chamber 7 from which a hydrogen gas containing water vapor (hereafter referred to as hydrogen) flows out.

An example of the anode gas is a hydrogen-containing gas. That is, protons are generated from hydrogen in the hydrogen-containing gas at the anode AN. Other examples of the hydrogen-containing gas include a reformed gas and a hydrogen-containing gas that contains water vapor generated through electrolysis of water.

Hereafter, the structure of the electrochemical hydrogen pump 100 and the configuration of a hydrogen supply system 200 in the case where a hydrogen containing gas is used as an anode gas supplied to the anode chamber 6 will be described.

In the electrochemical hydrogen pump 100 illustrated in FIG. 3, a hydrogen inflow path through which a hydrogen-containing gas flows into the anode chamber 6 from the outside constitutes an anode gas flow path 6A, and a hydrogen outflow path through which hydrogen present in the cathode chamber 7 flows out from the cathode chamber 7 constitutes a cathode gas flow path 7A. However, such a structure is merely illustrative and is not limited to that in this example. For example, a hydrogen outflow path through which a hydrogen-containing gas flows out from the anode chamber 6 may be disposed in the anode chamber 6. In other words, the electrochemical hydrogen pump 100 may have such a structure that a hydrogen-containing gas circulates in the anode chamber 6.

The proton conductive electrolyte membrane 10 is a proton (H$^+$)-permeable membrane having a pair of main surfaces. The proton conductive electrolyte membrane 10 may have any structure as long as it is an electrolyte membrane having proton conductivity. Examples of the proton conductive electrolyte membrane 10 include fluoropolymer electrolyte membranes and hydrocarbon electrolyte membranes. Specific examples thereof include Nafion (registered trademark, manufactured by DuPont) and Aciplex (registered trademark, manufactured by Asahi Kasei Corporation).

The anode AN is disposed on a first main surface of the proton conductive electrolyte membrane 10. The anode AN includes an anode catalyst layer and an anode gas diffusion layer. The anode catalyst layer is disposed on the first main surface of the proton conductive electrolyte membrane 10.

The cathode CA is disposed on a second main surface of the proton conductive electrolyte membrane 10. The cathode CA includes a cathode catalyst layer and a cathode gas diffusion layer. The cathode catalyst layer is disposed on the second main surface of the proton conductive electrolyte membrane 10.

The catalyst metal for the anode catalyst layer and the cathode catalyst layer may be, for example, platinum (Pt), but is not limited thereto. The catalyst carrier for the anode catalyst layer and the cathode catalyst layer may be, for example, carbon.

Any method for preparing a catalyst may be employed for the cathode catalyst layer and the anode catalyst layer, and thus the method is not particularly limited. Examples of the catalyst carrier include conductive porous material powders and carbon powders. Examples of the carbon powders include powders of graphite, carbon black, and activated carbon having electrical conductivity. The method for supporting platinum or another catalyst metal on a carrier such as carbon is not particularly limited. For example, a method such as powder mixing or liquid-phase mixing may be employed. The latter liquid-phase mixing may be, for example, a method in which a carrier such as carbon is dispersed in a catalyst colloidal solution to cause adsorption.

If necessary, platinum or another catalyst metal may be supported using an active oxygen remover as a carrier by the same method as above. The state in which the catalyst metal such as platinum is supported on the carrier is not particularly limited. For example, the catalyst metal may be micronized and supported on the carrier in a highly dispersed state.

The cathode gas diffusion layer is disposed on the cathode catalyst layer. The cathode gas diffusion layer is formed of a porous material and has conductivity and gas diffusivity. The cathode gas diffusion layer desirably has elasticity so as to appropriately follow the displacement and deformation of members caused by differential pressure between the cathode CA and the anode AN during the operation of the electrochemical hydrogen pump 100.

The anode gas diffusion layer is disposed on the anode catalyst layer. The anode gas diffusion layer is formed of a porous material and has conductivity and gas diffusivity. The anode gas diffusion layer desirably has rigidity enough to endure the press of the proton conductive electrolyte membrane 10 at high pressure.

The voltage applier 14 is a unit for applying a voltage between the anode AN and the cathode CA. Specifically, the voltage applier 14 has a high potential terminal connected to the anode AN and a low potential terminal connected to the cathode CA. The voltage applier 14 controls the passage of electric current between the anode AN and the cathode CA. The voltage applier 14 may have any configuration as long as the passage of electric current can be achieved between the anode AN and the cathode CA.

The voltage applier 14 includes a DC/DC converter when connected to a direct-current power supply such as a battery, a solar cell, or a fuel cell. The voltage applier 14 includes an AC/DC converter when connected to an alternating-current power supply such as a commercial power supply.

The voltage applier 14 may be, for example, a power-type power supply in which the voltage applied between the anode AN and the cathode CA and the current flowing between the anode AN and the cathode CA are adjusted so that the power supplied to the electrochemical hydrogen pump 100 is controlled to be a predetermined set value.

The cooler 21B is a unit for cooling the cell 20. The cooler 21B may have any configuration as long as the cell 20 can be cooled. The cooler 21B may be, for example, a cooling fan that cools the electrochemical hydrogen pump 100 from its periphery. When the electrochemical hydrogen pump 100 includes a stacked body in which cells 20 and separators are alternately stacked, the cooler 21B may be a cooling unit for cooling the cells 20 by circulating cold water through the stacked body. That is, in this case, a water flow path (not illustrated) through which the cold water passes is formed in the stacked body, and the cooler 21B includes a unit for keeping the cold water at an appropriate temperature. The water flow path may be formed on, for example, the back surfaces of the separators that do not face the cells 20. Thus, the cells 20 are cooled by heat exchange with low-temperature cold water.

When the pressure of the cathode gas flow path 7A increases, the controller 50 controls the cooler 21B to increase the amount of cooling per unit time of the cell 20. That is, when the pressure of the cathode gas flow path 7A increases, a step of increasing the amount of cooling per unit time with the cooler 21B that cools the cell 20 is performed.

For example, when the pressure of the cathode gas flow path 7A increases, the controller 50 may control the cooler 21B to increase the amount of cooling per unit time of the cell 20 so that the temperature of the cell 20 decreases. That is, when the pressure of the cathode gas flow path 7A increases, a step of increasing the amount of cooling per unit time with the cooler 21B so that the temperature of the cell 20 decreases is performed.

For example, in the case where the cooler 21B is a cooling unit for cooling the cells 20 by circulating cold water through a stacked body in which cells 20 and separators are alternately stacked, the controller 50 may decrease the temperature of the cold water sent to the stacked body when the pressure of the cathode gas flow path 7A increases.

For example, as illustrated in FIG. 3, a pressure gage 22 is disposed on the cathode gas flow path 7A through which hydrogen present in the cathode chamber 7 flows out from the cathode chamber 7, and the controller 50 may control the cooler 21B based on the measured data of the pressure gage 22 to increase the amount of cooling per unit time of the cell 20 when the pressure of the cathode gas flow path 7A increases.

In this specification, the "increasing the amount of cooling per unit time of the cell 20" does not necessarily result in a decrease in the temperature of the cell 20. The "increasing the amount of cooling per unit time of the cell 20" may also result in the case where the temperature of the cell 20 is constant or the case where an increase in the temperature of the cell 20 is suppressed. An example of such a case is a case where the cell 20 generates heat while the pressure of the cathode gas flow path 7A increases. The "increasing the amount of cooling per unit time of the cell 20" also refers to an increase in the amount of cooling from zero, that is, an operation of the cooler 21B from an OFF state to an ON state.

Figure 4:
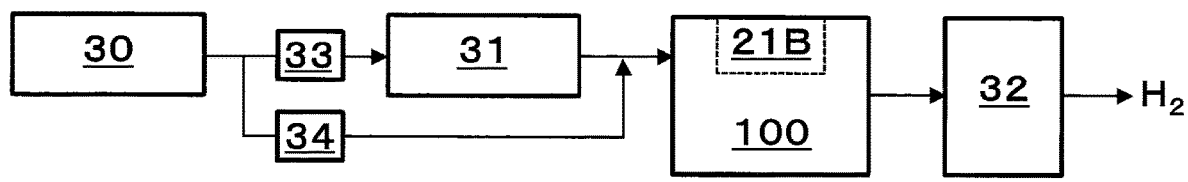
FIG. 4 illustrates an example of a hydrogen supply system according to an embodiment.

Herein, when the temperature of the cell 20 is decreased by using the cooler 21B, the dew point of a hydrogen-containing gas that flows into the anode chamber 6 of the electrochemical hydrogen pump 100 is desirably decreased in accordance with the temperature of the cell 20 using a dew point adjuster 31 (refer to FIG. 4, e.g., a humidifier). For example, the dew point of a hydrogen-containing gas that flows into the anode chamber 6 may be adjusted using a humidifier so that the dew point of the hydrogen-containing gas decreases to a dew point lower than or equal to the temperature of the cell 20.

The controller 50 may have any configuration as long as the controller 50 has a control function. The controller 50 includes, for example, an arithmetic circuit (not illustrated) and a memory circuit (not illustrated) that stores a control program. Examples of the arithmetic circuit include microprocessor units (MPUs) and central processing units (CPUs). An example of the memory circuit is a memory. The controller 50 may be constituted by a single controller that performs centralized control or a plurality of controllers that co-operate to perform distributed control.

Although not illustrated in FIG. 3, members required for the hydrogen compression operation of the electrochemical hydrogen pump 100 are appropriately disposed.

For example, a pair of carbon separators may sandwich the anode AN and the cathode CA of the cell 20 from the outside. In this case, the separator in contact with the anode AN is a sheet-shaped conductive member for supplying a hydrogen-containing gas to the anode AN. This sheet-shaped member includes a fluid flow path through which the hydrogen-containing gas supplied to the anode AN flows. The separator in contact with the cathode CA is a sheet-shaped conductive member for emitting hydrogen from the cathode CA. This sheet-shaped member includes a fluid flow path through which hydrogen emitted from the cathode CA flows. These fluid flow paths may be provided separately from the separators, but are generally provided by, for example, forming grooves of the fluid flow paths on the surfaces of the separators in a serpentine shape.

In the electrochemical hydrogen pump 100, sealing members such as gaskets are normally assembled on both sides of the cell 20 in an integrated manner in advance to prevent high-pressure hydrogen from leaking to the outside. The above separators for mechanically fixing the cells 20 and electrically connecting adjacent cells 20 to each other in series are disposed outside the cells 20.

A typical stacked structure is provided as follows. The cells 20 and the separators are alternately stacked to form a stacked body including 10 to 200 cells 20. The stacked body is sandwiched between end plates with current collecting plates and insulating plates disposed therebetween, and both the end plates are fastened with fastening rods. In this case, to supply an appropriate amount of fluid to the fluid flow paths of the separators, it is necessary to form a groove-like path branched from an appropriate pipe line in each of the separators and to connect the downstream end of the groove-like path to the fluid flow path of each of the separators. Such a pipe line is referred to as a manifold, and the manifold is constituted by a series of through-holes provided at appropriate positions of the separators.

The above members not illustrated are merely illustrative and are not limited to those in this example.

Configuration of Hydrogen Supply System

FIG. 4 illustrates an example of a hydrogen supply system according to an embodiment.

In the example illustrated in FIG. 4, a hydrogen supply system 200 includes an electrochemical hydrogen pump 100, a hydrogen generator 30, a dew point adjuster 31, a hydrogen storage 32, a first hydrogen supplier 33, and a second hydrogen supplier 34. The electrochemical hydrogen pump 100 in FIG. 4 is the same as the electrochemical hydrogen pump 100 in FIG. 3 and thus the description thereof is omitted.

The hydrogen generator 30 is a device for generating a hydrogen-containing gas. The hydrogen generator 30 may have any configuration as long as a hydrogen-containing gas can be generated. A non-limiting example of the hydrogen generator 30 is a water electrolysis device that generates a hydrogen-containing gas through electrolysis of water. Although not illustrated, units required for generating a hydrogen-containing gas in the water electrolysis device are appropriately provided. For example, a water pump for supplying water to the water electrolysis device and an electrolyte membrane for conducting protons generated through electrolysis of water may be provided. A catalyst layer may also be provided on each of the main surfaces of the electrolyte membrane. A voltage applier for applying a voltage between the catalyst layers may also be provided.

The hydrogen storage 32 is a device for storing high-pressure hydrogen ($H_2$) supplied from the cathode chamber 7 of the electrochemical hydrogen pump 100 through the cathode gas flow path 7A (refer to FIG. 3). The hydrogen storage 32 may have any configuration as long as such hydrogen can be stored. A non-limiting example of the hydrogen storage 32 is a tank.

Hydrogen in the hydrogen storage 32 may be supplied to a hydrogen demander at an appropriate time. Examples of the hydrogen demander include fuel cells for household use and automobiles.

The dew point adjuster 31 is a device for adjusting the dew point of a hydrogen-containing gas supplied to the anode chamber 6 of the electrochemical hydrogen pump 100 through the anode gas flow path 6A (refer to FIG. 3). The dew point adjuster 31 may have any configuration as long as the dew point of such a hydrogen-containing gas can be adjusted. For example, the dew point adjuster 31 may include a humidifier for humidifying a hydrogen-containing gas. Examples of the humidifier include bubbler humidifiers in which a hydrogen-containing gas is humidified by being passed through hot water and humidifiers in which a hydrogen-containing gas is humidified using a moisture permeable membrane.

The first hydrogen supplier 33 is a device for controlling the flow rate of a hydrogen-containing gas supplied from the hydrogen generator 30 to the dew point adjuster 31. The first hydrogen supplier 33 may have any configuration as long as the flow rate of a hydrogen-containing gas supplied to the dew point adjuster 31 can be controlled. Examples of the first hydrogen supplier 33 include on-off valves, mass flow controllers, flow rate control valves.

The second hydrogen supplier 34 is a device for controlling the flow rate of a hydrogen-containing gas supplied from the hydrogen generator 30 to the anode chamber 6 of the electrochemical hydrogen pump 100 by bypassing the dew point adjuster 31. The second hydrogen supplier 34 may have any configuration as long as the flow rate of a hydrogen-containing gas supplied to the anode chamber 6 can be controlled. Examples of the second hydrogen supplier 34 include on-off valves, mass flow controllers, and flow rate control valves.

A third hydrogen supplier (not illustrated) that serves as both the first hydrogen supplier 33 and the second hydrogen supplier 34 may be provided at the branch position of the bypass flow path at which the second hydrogen supplier 34 is disposed, instead of the first hydrogen supplier 33 and the second hydrogen supplier 34. Examples of the third hydrogen supplier include three-way switch valves and three-way flow rate control valves.

A recycling flow path (not illustrated) through which a hydrogen-containing gas discharged from the anode chamber 6 is sent to a hydrogen supply flow path located between the hydrogen generator 30 and the branch position may be provided.

Thus, in the hydrogen supply system 200 according to this embodiment, the amount of humidification of a hydrogen-containing gas supplied to the anode chamber 6 of the electrochemical hydrogen pump 100 can be adjusted to an appropriate amount by the dew point adjuster 31. For example, when the dew point adjuster 31 includes the above-mentioned bubbler humidifier, the amount of humidification of a hydrogen-containing gas can be appropriately adjusted in accordance with the temperature of hot water.

In the hydrogen supply system 200 according to this embodiment, the amount of humidification of a hydrogen-containing gas supplied to the anode chamber 6 of the electrochemical hydrogen pump 100 can be adjusted to an appropriate amount by mixing a wet hydrogen-containing gas that passes through the dew point adjuster 31 and a dry hydrogen-containing gas that bypasses the dew point adjuster 31.

Herein, the temperature of a dry hydrogen-containing gas that bypasses the dew point adjuster 31 is often lower than that of a wet hydrogen-containing gas that passes through the dew point adjuster 31. Therefore, the cell 20 of the electrochemical hydrogen pump 100 can be cooled by increasing the flow rate of the dry hydrogen-containing gas that bypasses the dew point adjuster 31.

Operation

Hereafter, a method for operating the electrochemical hydrogen pump 100 according to an embodiment (hydrogen compression operation) will be described with reference to the attached drawings. Herein, a method for operating the electrochemical hydrogen pump 100 using a hydrogen-containing gas as an anode gas supplied to the anode AN will be described.

The following operation is performed by, for example, causing the arithmetic circuit of the controller 50 to read a control program from the memory circuit. However, the following operation is not necessarily performed by the controller 50. An operator may perform a part of the operation.

First, a voltage is applied between the anode AN and the cathode CA of the cell 20 by the voltage applier 14.

Subsequently, when a hydrogen-containing gas is supplied to the cell 20, hydrogen ($H_2$) in the hydrogen-containing gas releases electrons at the anode AN to become protons ($H^+$) (formula (1)). The released electrons move to the cathode CA through the voltage applier 14.

The protons permeate through the proton conductive electrolyte membrane 10 and come into contact with the cathode CA. At the cathode CA, the protons that have permeated through the proton conductive electrolyte membrane 10 and the electrons cause a reduction reaction to generate hydrogen ($H_2$) (formula (2)).

The relational expression between the gas pressure $P_{AN}$ of the anode chamber 6, the gas pressure $P_{CA}$ of the cathode chamber 7, and the voltage E of the voltage applier 14 is derived from the Nernst equation (3) in the following oxidation-reduction reaction. It is easily understood from the equation (3) that the gas pressure $P_{CA}$ of the cathode chamber 7 can be increased by increasing the voltage E of the voltage applier 14.

$$\text{Anode AN: } H_2 \text{ (low pressure)} \rightarrow 2H^+ + 2e^- \quad (1)$$

$$\text{Cathode CA: } 2H^+ + 2e^- \rightarrow H_2 \text{ (high pressure)} \quad (2)$$

$$E = (RT/2F)\ln(P_{CA}/P_{AN}) + ir \quad (3)$$

In the equation (3), R represents the gas constant (8.3145 J/K·mol), T represents a temperature (K), F represents the Faraday constant (96485 C/mol), $P_{CA}$ represents the gas pressure of the cathode chamber 7, $P_{AN}$ represents the gas pressure of the anode chamber 6, i represents a current density (A/cm$^2$), and r represents a cell resistance (Ω·cm$^2$).

Thus, a step of applying a voltage between the cathode CA and the anode AN to supply high-pressure hydrogen to the cathode CA is performed.

As illustrated in FIG. 3, when an electric current flows between the anode AN and the cathode CA of the cell 20, the protons ($H^+$) move from the anode AN to the cathode CA through the proton conductive electrolyte membrane 10 together with water molecules (electroosmosis). At this time, the proton conductivity of the proton conductive electrolyte membrane 10 increases with increasing the temperature of the cell 20, which increases the efficiency of the hydrogen compression operation of the electrochemical hydrogen pump 100.

The water that has moved from the anode AN to the cathode CA of the cell 20 moves from the cathode CA to the anode AN as indicated by a dot-and-dash line in FIG. 3 because of the differential pressure between the cathode CA and the anode AN of the cell 20 (back diffusion). The amount of water that back-diffuses through the proton conductive electrolyte membrane 10 is dependent on the differential pressure between the cathode CA and the anode AN of the cell 20 and the temperature of the cell 20. Specifically, the amount of water that moves from the cathode CA to the anode AN of the cell 20 increases as the gas pressure of the cathode chamber 7 increases and the temperature of the cell 20 increases.

From this viewpoint, in the method for operating an electrochemical hydrogen pump 100 according to an embodiment, the temperature of the cell 20 is controlled as follows. The following description provides a control example in which when the cathode-side pressure Px increases, the temperature of the cell 20 is decreased.

Figure 5:
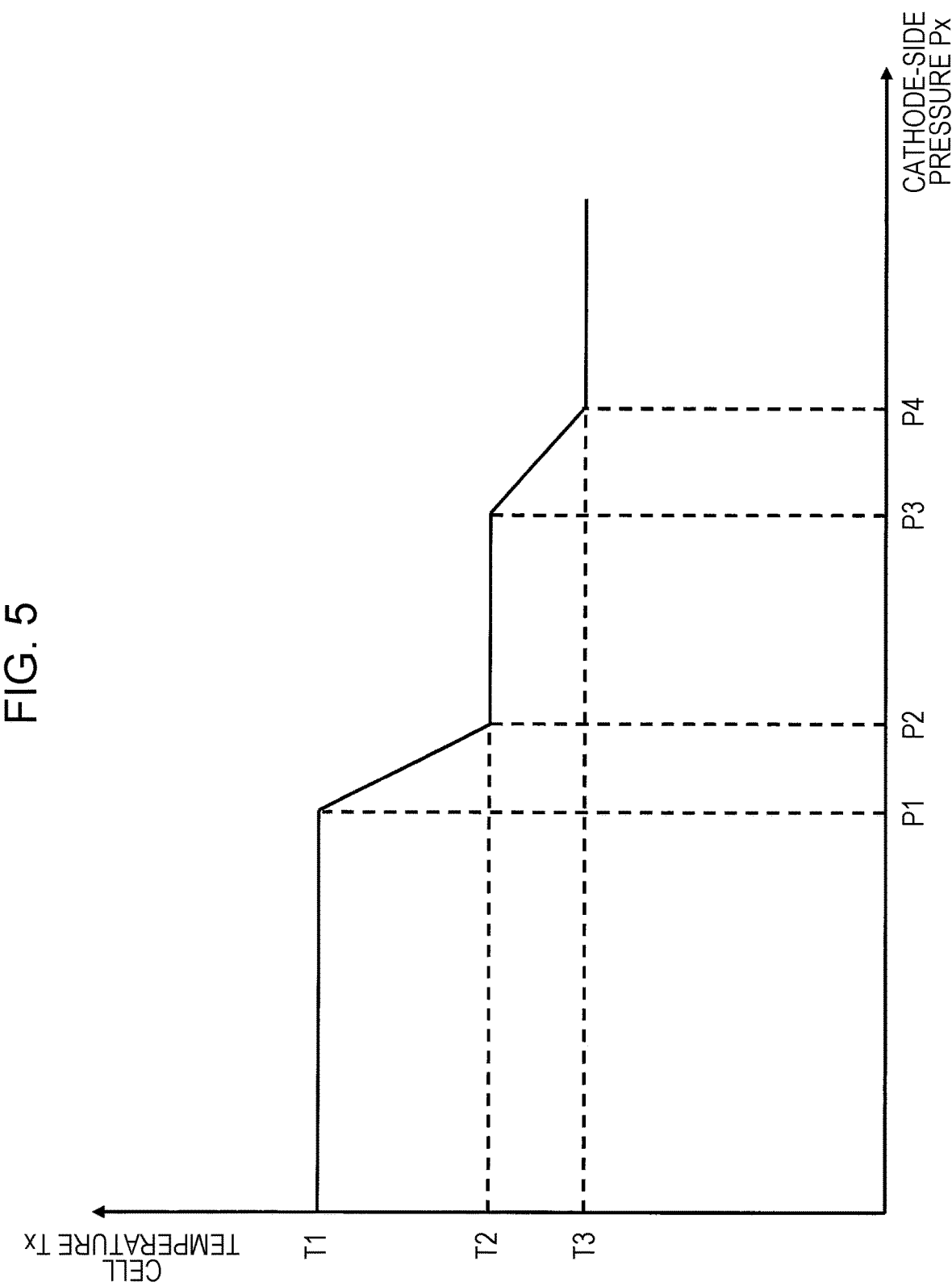
FIG. 5 illustrates an example of a cell temperature in a hydrogen compression operation of an electrochemical hydrogen pump according to an embodiment.

FIG. 5 illustrates an example of the cell temperature in a hydrogen compression operation of the electrochemical hydrogen pump according to an embodiment. In FIG. 5, the horizontal axis shows the pressure of the cathode gas flow path 7A (hereafter referred to as a cathode-side pressure Px) and the vertical axis shows the temperature of the cell 20 (hereafter referred to as a cell temperature Tx) of the electrochemical hydrogen pump 100.

Upon startup of the electrochemical hydrogen pump 100, the controller 50 controls the cooler 21B to increase the cell temperature Tx to a temperature T1. The temperature T1 may be set to, for example, about 65° C.

At the initial stage of the hydrogen compression operation at which the cathode-side pressure Px is not high (in this example, a pressure section at a pressure of less than P1), the amount of water that back-diffuses through the proton conductive electrolyte membrane 10 is small. Therefore, at such an initial stage, the controller 50 controls the cooler 21B to maintain the cell temperature Tx at a temperature T1.

If the cell temperature Tx remains at the temperature T1 when the cathode-side pressure Px reaches a pressure P1, the amount of water that back-diffuses through the proton conductive electrolyte membrane 10 is excessively increased. Consequently, the diffusivity of the hydrogen-containing gas may be inhibited on the anode AN side because of flooding.

To prevent this, the controller 50 controls the cooler 21B to decrease the temperature of the cell 20 with increasing the pressure of the cathode gas flow path 7A. That is, a step of decreasing the temperature of the cell 20 with increasing the pressure of the cathode gas flow path 7A (e.g., when the pressure of the cathode gas flow path 7A increases) is performed by the cooler 21B.

For example, as illustrated in FIG. 5, when the cathode-side pressure Px increases from the pressure P1 to a pressure P2, the controller 50 controls the cooler 21B to decrease the cell temperature Tx from the temperature T1 to a temperature T2. Specifically, the cell temperature Tx is substantially linearly decreased with increasing the cathode-side pressure Px from the pressure P1 so that the cell temperature Tx reaches the temperature T2 when the cathode-side pressure Px reaches the pressure P2. The temperature T2 may be set to, for example, about 50° C. The pressure P1 and the pressure P2 may be respectively set to about 12 MPa and about 15 MPa.

If the cell temperature Tx remains at the temperature T2 when the cathode-side pressure Px reaches a pressure P3, the amount of water that back-diffuses through the proton conductive electrolyte membrane 10 is excessively increased. Consequently, the diffusivity of the hydrogen-containing gas may be inhibited on the anode AN side because of flooding.

To prevent this, when the cathode-side pressure Px increases from the pressure P3 to a pressure P4, the controller 50 controls the cooler 21B to decrease the cell temperature Tx from the temperature T2 to a temperature T3. Specifically, the cell temperature Tx is substantially linearly decreased with increasing the cathode-side pressure Px from the pressure P3 so that the cell temperature Tx reaches the temperature T3 when the cathode-side pressure Px reaches the pressure P4. The temperature T3 may be set to, for example, about 40° C. The pressure P3 and the pressure P4 may be respectively set to about 18 MPa and about 20 MPa.

The above temperatures and pressures are merely illustrative and are not limited to those in this example.

As described above, the electrochemical hydrogen pump 100 and the method for operating the electrochemical hydrogen pump 100 according to this embodiment provide a higher efficiency of the hydrogen compression operation than those in the related art.

Specifically, the amount of water that moves from the cathode CA to the anode AN because of the differential pressure between the cathode CA and the anode AN increases as the pressure of the cathode gas flow path 7A increases and the temperature of the cell 20 increases. That is, the amount of water that back-diffuses through the proton conductive electrolyte membrane 10 has a positive correlation with the pressure of the cathode gas flow path 7A and the temperature of the cell 20. Therefore, the possibility that the diffusivity of an anode gas is inhibited on the anode AN side because of flooding increases as the pressure of the cathode gas flow path 7A increases.

In the electrochemical hydrogen pump 100 and the method for operating the electrochemical hydrogen pump 100 according to this embodiment, such a possibility can be reduced by appropriately controlling the temperature of the cell 20 with the cooler 21B in the process in which the pressure of the cathode gas flow path 7A increases. That is, when the pressure of the cathode gas flow path 7A increases, the possibility that the diffusivity of an anode gas is inhibited on the anode AN side because of flooding can be reduced by increasing the amount of cooling with the cooler 21B. This can suppress an increase in the diffusion overvoltage of the electrochemical hydrogen pump 100 due to inhibition of the diffusivity of an anode gas on the anode AN side. Therefore, high efficiency of the hydrogen compression operation of the electrochemical hydrogen pump 100 can be maintained.

First Example

Figure 6:
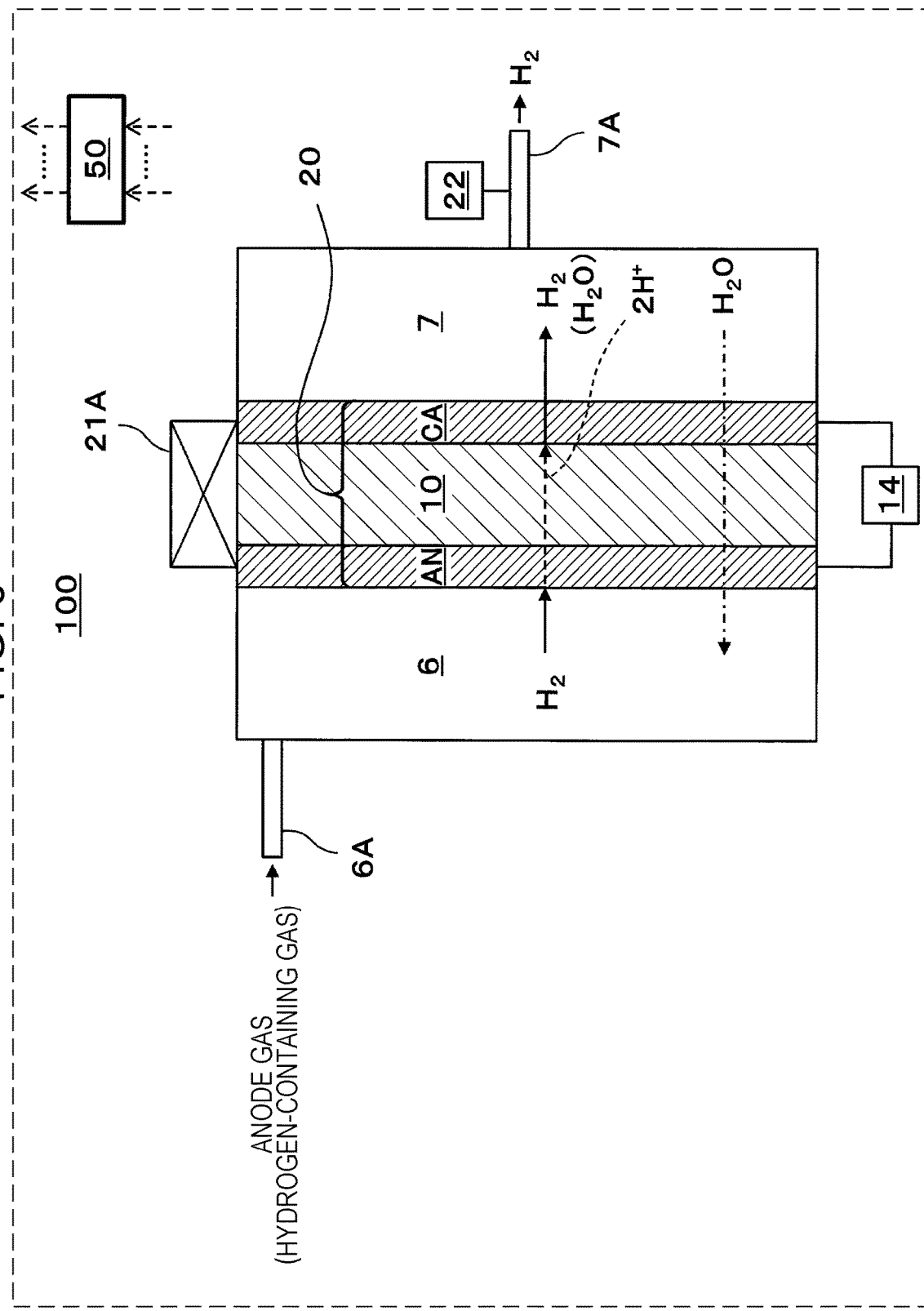
FIG. 6 illustrates an example of an electrochemical hydrogen pump in a first example of an embodiment.

FIG. 6 illustrates an example of an electrochemical hydrogen pump in a first example according to an embodiment.

In the example illustrated in FIG. 6, an electrochemical hydrogen pump 100 includes a cell (MEA) 20, a voltage applier 14, a heater 21A, a pressure gage 22, and a controller 50.

The cell 20, the voltage applier 14, and the pressure gage 22 are the same as those in the above embodiment and thus the descriptions thereof are omitted.

The heater 21A is a unit for heating the cell 20. The heater 21A may have any configuration as long as the cell 20 can be heated. The heater 21A may be, for example, an electric heater that heats the electrochemical hydrogen pump 100 from its periphery. When the electrochemical hydrogen pump 100 includes a stacked body obtained by alternately stacking cells 20 and separators, the heater 21A may be a heating unit that heats the cells 20 by circulating hot water through the stacked body. That is, in this case, a water flow path (not illustrated) through which the hot water passes is formed in the stacked body, and the heater 21A includes a unit for maintaining the hot water at an appropriate temperature. The water flow path may be formed on, for example, the back surfaces of the separators that do not face the cells 20. Thus, the cells 20 are heated by heat exchange with high-temperature hot water.

When the pressure of the cathode gas flow path 7A increases, the controller 50 decreases the amount of heating with the heater 21A. That is, when the pressure of the cathode gas flow path 7A increases, a step of decreasing the amount of heating with the heater 21A is performed. For example, in the case where the heater 21A is a heating unit that heats the cells 20 by circulating hot water through a stacked body obtained by alternately stacking the cells 20 and the separators, when the pressure of the cathode gas flow path 7A increases, the controller 50 may decrease the temperature of hot water sent to the stacked body.

Accordingly, in the electrochemical hydrogen pump 100 and the method for operating the electrochemical hydrogen pump 100 according to this example, the temperature of the cell 20 can be appropriately controlled by the heater 21A in the process in which the pressure of the cathode gas flow path 7A increases. That is, when the pressure of the cathode gas flow path 7A increases, an increase in the temperature of the cell 20 is suppressed by decreasing the amount of heating with the heater 21A. Consequently, the possibility that the diffusivity of an anode gas is inhibited on the anode AN side because of flooding can be reduced.

The electrochemical hydrogen pump 100 and the method for operating the electrochemical hydrogen pump 100 according to this example may be the same as those in the embodiment, except for the above features.

Second Example

An electrochemical hydrogen pump and a method for operating the electrochemical hydrogen pump according to this example are the same as those in the first example (FIG. 6), except for the control mechanism below of the heater 21A with the controller 50.

Before the voltage applier 14 applies a voltage between the anode AN and the cathode CA, the controller 50 starts a heating operation of the heater 21A to increase the temperature of the cell 20. That is, before the voltage applier 14 applies a voltage between the anode AN and the cathode CA, a step of starting a heating operation of the heater 21A to increase the temperature of the cell 20 is performed.

A differential pressure between the anode AN and the cathode CA is not generated before the voltage applier 14 applies a voltage between the anode AN and the cathode CA. In this case, the back diffusion of water through the proton conductive electrolyte membrane 10 is less likely to occur. Thus, even if the temperature of the cell 20 is increased to a high temperature, the inhibition of the diffusivity of an anode gas on the anode AN side due to flooding is suppressed. Therefore, in the electrochemical hydrogen pump 100 and the method for operating the electrochemical hydrogen pump 100 according to this example, the temperature of the cell 20 can be increased to a high temperature by starting a heating operation of the heater 21A before the voltage applier 14 applies a voltage between the anode AN and the cathode CA compared with the case where such a heating operation is not performed. Thus, the proton conductive electrolyte membrane 10 exhibits high proton conductivity at the beginning of the hydrogen compression operation of the electrochemical hydrogen pump 100, which can improve the efficiency of the hydrogen compression operation of the electrochemical hydrogen pump 100.

The electrochemical hydrogen pump 100 and the method for operating the electrochemical hydrogen pump 100 according to this example may be the same as those in the embodiment or those in the first example of the embodiment, except for the above features.

Third Example

An electrochemical hydrogen pump and a method for operating the electrochemical hydrogen pump according to this example are the same as those in the first example (FIG. 6), except for the control mechanism below of the heater 21A with the controller 50.

The controller 50 controls the voltage applier 14 to apply a voltage between the anode AN and the cathode CA to increase the temperature of the cell 20 through heating with the heater 21A for at least a part of the duration for which the pressure of the cathode gas flow path 7A increases, and then decreases the amount of heating with the heater 21A when the pressure of the cathode gas flow path 7A increases. That is, a step of applying a voltage between the anode AN and the cathode CA using the voltage applier 14 to increase the temperature of the cell 20 through heating with the heater 21A for at least a part of the duration for which the pressure of the cathode gas flow path 7A increases is performed, and then the amount of heating with the heater 21A is decreased when the pressure of the cathode gas flow path 7A increases.

Accordingly, in the electrochemical hydrogen pump 100 and the method for operating the electrochemical hydrogen pump 100 according to this example, the temperature of the cell 20 can be appropriately controlled by the heater 21A in the process in which the pressure of the cathode gas flow path 7A increases. That is, at least a part of the duration for which the pressure of the cathode gas flow path 7A increases is a duration for which the inhibition of the diffusivity of an anode gas on the anode AN side due to flooding is suppressed even if the temperature of the cell 20 is increased to a high temperature. Therefore, when the temperature of the cell 20 is increased, the proton conductive electrolyte membrane 10 exhibits high proton conductivity, which can improve the efficiency of the hydrogen compression operation of the electrochemical hydrogen pump 100. After that, by decreasing the amount of heating with the heater 21A when the pressure of the cathode gas flow path 7A increases, the possibility that the diffusivity of an anode gas is inhibited on the anode AN side because of flooding can be reduced.

The electrochemical hydrogen pump 100 and the method for operating the electrochemical hydrogen pump 100 according to this example may be the same as those in the embodiment, the first example of the embodiment, or the second example of the embodiment, except for the above features.

The embodiment, the first example of the embodiment, the second example of the embodiment, and the third example of the embodiment may be combined with each other unless they contradict with each other.

For example, when the electrochemical hydrogen pump 100 includes a water circulation device that circulates water through a water flow path formed in a stacked body obtained by alternately stacking cells 20 and separators, the water circulation device can be caused to function as the cooler 21B in the embodiment and the heater 21A in the first example by appropriately controlling the temperature of water that passes through the stacked body.

It will be obvious to those skilled in the art from the above description that many modifications or other embodiments can be provided in the present disclosure. Therefore, the above description should be interpreted as being illustrative and is provided in order to teach the best modes for carrying out the present disclosure to those skilled in the art. The details of the structure and/or the function of the present disclosure can be substantially changed without departing from the spirit of the present disclosure.

For example, it has been described above that upon startup of the electrochemical hydrogen pump 100, a heating operation in which the heater 21A increases the temperature of the cell 20 is performed, but this is not limited to the above description. For example, the cell 20 generates heat because of the IR loss of the cell 20 of the electrochemical hydrogen pump 100, the heat of condensation of water, and the like, and thus such a heating operation is sometimes not required. That is, the electrochemical hydrogen pump 100 includes only a function that cools the cell 20 in some cases.

One aspect of the present disclosure can be used for an electrochemical hydrogen pump in which the efficiency of a hydrogen compression operation can be improved compared with that in the related art and a method for operating the electrochemical hydrogen pump.

What is claimed is:

1. An electrochemical hydrogen pump comprising:
   a cell including:
      a proton conductive electrolyte membrane having a first main surface and a second main surface,
      a cathode disposed on the first main surface of the proton conductive electrolyte membrane, and
      an anode disposed on the second main surface of the proton conductive electrolyte membrane;
   a voltage applier that applies a voltage between the anode and the cathode;
   a cooler that cools the cell; and
   a controller including a processor and a memory storing a control program, wherein the control program, when executed by the processor, causes the controller to control the cooler to increase an amount of cooling per unit time of the cell when a pressure of a cathode gas flow path on the cathode increases.

2. The electrochemical hydrogen pump according to claim 1, wherein when the pressure of the cathode gas flow path increases, the control program causes the controller to control the cooler to increase the amount of cooling per unit time of the cell so that a temperature of the cell decreases.

3. The electrochemical hydrogen pump according to claim 1, comprising:
   a heater that heats the cell,
   wherein when the pressure of the cathode gas flow path increases, the control program causes the controller to decrease an amount of heating with the heater.

4. The electrochemical hydrogen pump according to claim 3, wherein before the voltage applier applies the voltage, the control program causes the controller to start a heating operation of the heater to increase a temperature of the cell.

5. The electrochemical hydrogen pump according to claim 3, wherein the control program causes the controller to control the voltage applier to apply the voltage to increase a temperature of the cell through heating with the heater for at least a part of a duration for which the pressure of the cathode gas flow path increases, and then causes the controller to decrease the amount of heating with the heater when the pressure of the cathode gas flow path increases.

6. A method for operating an electrochemical hydrogen pump including a cell including:
   a proton conductive electrolyte membrane having a first main surface and a second main surface;
   a cathode disposed on the first main surface of the proton conductive electrolyte membrane; and
   an anode disposed on the second main surface of the proton conductive electrolyte membrane,
   the method comprising:
   applying a voltage between the cathode and the anode to supply high-pressure hydrogen to the cathode; and
   increasing an amount of cooling per unit time with a cooler that cools the cell when a pressure of a cathode gas flow path on the cathode increases.

7. The method for operating an electrochemical hydrogen pump according to claim 6, wherein when the pressure of the cathode gas flow path increases, the amount of cooling per unit time with the cooler is increased so that a temperature of the cell decreases.

8. The method for operating an electrochemical hydrogen pump according to claim 7, wherein when the pressure of the cathode gas flow path increases, an amount of heating with a heater that heats the cell is decreased.

9. The method for operating an electrochemical hydrogen pump according to claim 8, comprising starting a heating operation of the heater to increase the temperature of the cell before a voltage applier applies the voltage.

10. The method for operating an electrochemical hydrogen pump according to claim 8, comprising:
    applying the voltage using a voltage applier to increase the temperature of the cell through heating with the heater for at least a part of a duration for which the pressure of the cathode gas flow path increases; and
    decreasing the amount of heating with the heater when the pressure of the cathode gas flow path increases.

* * * * *